(12) United States Patent  (10) Patent No.: US 8,002,060 B2
Komatsu  (45) Date of Patent: Aug. 23, 2011

(54) VEHICLE WHEEL DRIVING APPARATUS AND ELECTRIC MOTOR

(75) Inventor: Michihiro Komatsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 767 days.

(21) Appl. No.: 11/707,260

(22) Filed: Feb. 16, 2007

(65) Prior Publication Data

US 2007/0193791 A1  Aug. 23, 2007

(30) Foreign Application Priority Data

Feb. 17, 2006 (JP) .............................. P. 2006-041483
Feb. 17, 2006 (JP) .............................. P. 2006-041497

(51) Int. Cl.
*B60K 7/00* (2006.01)

(52) U.S. Cl. .................................. 180/65.51; 180/65.6

(58) Field of Classification Search ................ 180/65.1, 180/65.51, 65.6, 908; 310/90, 91
See application file for complete search history.

(56) References Cited

U.S. PATENT DOCUMENTS

| | | | | |
|---|---|---|---|---|
| 3,812,928 A | * | 5/1974 | Rockwell et al. | 180/65.51 |
| 3,937,293 A | * | 2/1976 | Susdorf | 180/65.6 |
| 4,021,690 A | * | 5/1977 | Burton | 310/67 R |
| 4,539,497 A | * | 9/1985 | Boyer | 310/75 R |
| 5,472,059 A | * | 12/1995 | Schlosser et al. | 180/65.51 |
| 6,139,464 A | * | 10/2000 | Roske | 475/331 |
| 7,315,099 B2 | * | 1/2008 | Steffen et al. | 310/54 |
| 7,537,071 B2 | * | 5/2009 | Kamiya | 180/65.51 |

FOREIGN PATENT DOCUMENTS

| | | |
|---|---|---|
| JP | 64-14402 U | 1/1989 |
| JP | 05-087128 A | 4/1993 |
| JP | 06-048192 A | 2/1994 |
| JP | 07-081436 A | 3/1995 |
| JP | 2001-315534 A | 11/2001 |
| JP | 2002-321665 A | 11/2002 |
| JP | 2003-294033 A | 10/2003 |
| JP | 2004-092687 A | 3/2004 |

* cited by examiner

*Primary Examiner* — Frank B Vanaman

(74) *Attorney, Agent, or Firm* — Arent Fox LLP

(57) ABSTRACT

In a rolling bearing 21, a plurality of balls (rolling elements) 124 are arranged in an annular fashion, the balls 124 so arranged are held by inner and outer bearing rings 121, 122, some of the plurality of balls 124 are arranged along a pitch circle having a primary pitch circle diameter D1 so as to form a primary ball row 127, while the remaining of the plurality of balls are arranged along a pitch circle having a secondary pitch circle diameter D2 so as to form a secondary ball row 128, and the secondary pitch circle diameter D2 is made larger than the primary pitch circle diameter D1. The secondary ball row 128 is disposed radially outwards of the primary ball row 127 in such a manner as to overlap thereabove.

2 Claims, 14 Drawing Sheets

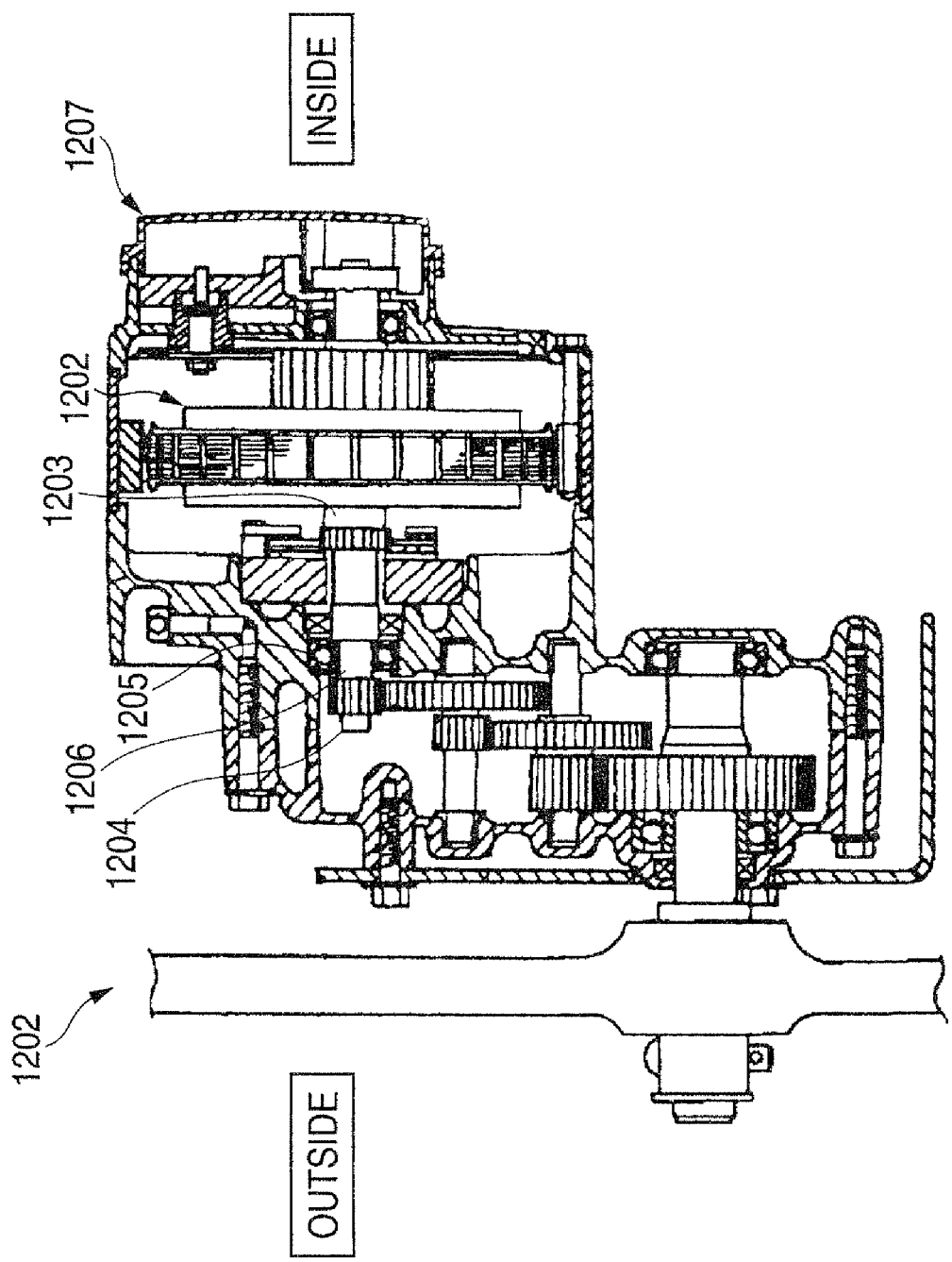
FIG. 14 -- PRIOR ART --

VEHICLE WHEEL DRIVING APPARATUS AND ELECTRIC MOTOR

BACKGROUND OF THE INVENTION

1. Field of the Invention

The present invention relates to a vehicle wheel driving apparatus and an electric motor which includes bearings and bearing mounting portions.

2. Description of Related Art

A vehicle wheel driving apparatus has a bearing, so that the bearing functions to reduce friction and receive reaction force when a component such as a hub is rotated. For example, there is a rolling bearing which is used to support a drive shaft of a vehicle (refer to, for example, Japanese Patent Unexamined Publication Document JP-A-2002-321665).

The JP-A-2002-321665 will be described based on the following drawing.

FIG. 6 is a drawing which explains a basic configuration of a technique according to the related art, and a related-art rolling bearing 201 supports a one end 204 side of a drive shaft 203, and a related-art rolling bearing 205 supports the other end 206 of the drive shaft 203.

The rolling bearings 201, 205 both have a general configuration (for example, refer to the Japanese Industrial Standard (JIS) number: JIS B0104) and each include an inner ring 207, an outer ring 208 and rolling elements 209 . . . ( . . . denotes the plurality. This will be true hereinafter). By disposing the rolling bearings 201, 205 apart from each other by a distance y, the weight of a final gear 211 and reaction force of driving force of the final gear can be supported between the rolling bearings 201, 205, thereby making it possible to enhance strength necessary to support the drive shaft 203.

In the rolling bearings 201, 205 used on the drive shaft 203 of the vehicle 202 in the JP-A-2002-321665, however, due to the rolling bearing 201 and the rolling bearing 205 being spaced apart from each other by the distance y, points of application of load need to be set at the distance y, whereby the construction in the axial construction of the drive shaft 203 tends to be enlarged. A rolling bearing has been in demand which can realize a reduction in size in the axial direction.

The JP-A-2002-321665 also describes an electric motor for driving a vehicle of the related art.

FIG. 14 is a drawing which explains a basic configuration of a technique according to the related art, and a related-art electric motor 1202 for driving a vehicle 1201 and is constructed such that an output end 1204 side of an output shaft 1203 of the electric motor 1202 is supported by a bearing 1205. A bearing portion 1206 is formed on the output end 1204 side into which the bearing 1205 is fitted, and a fitting hole 1208 is formed in a motor case 1207 into which the bearing 1205 is fitted, whereby the output shaft 1203 of the electric motor 1202 for driving the vehicle 1201 can be supported.

In the electric motor 1202 described in the JP-A-2002-321665 which is provided on the vehicle 1201 for driving the same, however, depending upon load, there may occur a case where the length of the bearing portion 1206 into which the bearing 1205 is fitted is increased. The bearing 1205 is a single-row bearing, but for example, in the event that the bearing 1205 is modified from the single-row bearing to a double-row bearing to match a condition such as load, the width of the bearing becomes large (thick), whereby the output shaft 1203 is elongated and the motor case 1207 is enlarged. There has been a demand for a decrease in the width of a double-row bearing for supporting an output shaft of an electric motor for driving a vehicle.

SUMMARY OF THE INVENTION

A problem to be solved by the invention is to provide a vehicle wheel driving apparatus and an electric motor in which the width of a double-row bearing can be decreased, while load or reaction force of the electric motor can be supported between points of application so as to secure the life of the bearing.

According to a first aspect of the invention, there is provided a vehicle wheel driving apparatus comprising
an in-wheel motor;
a hub of a wheel which comprises a driven portion;
a power transmission mechanism which transmits power of the in-wheel motor to the driven portion of the hub of the wheel; and
a double-row rolling bearing which supports the hub and comprises:
an inner ring disposed on a hub side;
an outer ring disposed on a stationary side; and
a plurality of rolling elements which is provided between the inner and outer rings and comprises:
a primary row; and
a secondary row of which pitch circle diameter is larger than that of the primary row, and which is positioned closer to the driven portion relative to the primary row,
wherein the in-wheel motor and the power transmission mechanism are mounted in a rim of the wheel,
the primary row is offset in an opposite direction from the secondary row along a wheel width direction.

According to a second aspect of the invention, as set forth in the first aspect of the invention, it is preferable that the secondary row is disposed radially outwards of the primary row in such a manner as to overlap the primary row thereabove.

According to a third aspect of the invention, as set forth in the first aspect of the invention, it is preferable that a point of application of load of the primary row of rolling elements is set outwards, and
a point of application of load of the secondary row is set inwards.

According to the first aspect of the invention, the double-row rolling bearing comprises the hub-side inner ring, the stationary-side outer ring and the plurality of rolling elements which are arranged in double rows between these inner and outer rings, the plurality of rolling elements comprising a first row, and a second row of which pitch circle diameter is larger than that of the first row, and which is positioned closer to the driven portion relative to the first row, wherein the first row is offset in an opposite direction from the second row along a wheel width direction.

Therefore, there is provided an advantage that the second row of rolling elements on the driven portion side whose pitch circle diameter is larger can be made to get close to the first row whose pitch circle diameter is smaller, thereby making it possible to decrease the width of the bearing of the vehicle wheel driving apparatus.

According to the second aspect of the invention, since the second row of rolling elements is disposed radially outwards of the first row of rolling elements in such a manner as to overlap the first row thereabove, the width of the bearing can be decreased further, thereby making it possible to decrease the width of the bearing further.

In addition, the width of the bearing is decreased, thereby making it possible to increase the degree of freedom in designing the interior of the wheel which is mounted on the hub.

According to the third aspect of the invention, since the point of application of load of the first row of rolling elements is set outwards, while the point of application of load of the second row of rolling elements is set inwards, even though the width of the bearing of the vehicle wheel driving apparatus is decreased, there is provided an advantage that a distance between the points of application of load is increased, so as to decrease load applied to the bearing, thereby making it possible to secure the life of the bearing.

According to a fourth aspect of the present invention, as set forth in the present invention, it is preferable that the in-wheel motor comprises:
- a motor shaft supported by a primary double row bearing and a secondary bearing; and
- an output portion which is extended in a axial direction of the motor shaft from a portion of the motor shaft supported by the primary double row bearing, and transmits the power of the in-wheel motor to the driven portion of the hub,
- wherein the secondary bearing supports an end of the motor shaft which is opposite side of the output portion,
- wherein the primary double row bearing comprises:
- inner and outer rings; and
- a plurality of rolling elements provided between the inner and outer rings and comprising:
    - a tertiary row which is positioned close to the driving portion; and
    - a fourth row which is positioned close to the secondary bearing,
- wherein a point of application of load of tertiary row is offset towards the output shaft portion side,
- a pitch circle diameter of the tertiary row is larger than that of fourth row, and
- the pitch circle diameter of the tertiary row is set such that the point of application of load of the tertiary row coincides with or gets close to a load point of the output shaft portion.

According to a fifth aspect of the invention, there is provided a vehicle wheel driving apparatus comprising
- an in-wheel motor mounted in a rim of a wheel;
- a hub of a wheel which rotates in accordance with a rotation of the in-wheel motor by a driven portion which receives power of the in-wheel motor; and
- a double-row rolling bearing which supports the hub and comprises:
- an inner race formed on an inner ring mounted on the hub;
- an outer race formed on an outer ring connected to a vehicle body; and
- a hub race formed on the hub;
- a plurality of rolling elements which comprises:
    - a primary row provided between the outer race and the hub race; and
    - a secondary row which is provided between the inner race and the outer race and is offset in an opposite direction to the primary row along a wheel width direction,
- wherein the secondary row is close to the driven portion of the hub relative to the primary row, and
- a pitch circle diameter of one of the primary and secondary row is larger than that of the other row.

According to a sixth aspect of the invention, there is provided an electric motor comprising:
- a motor shaft supported by a primary double row bearing and a secondary bearing; and
- an output portion which is extended in a axial direction of the motor shaft from a portion of the motor shaft supported by the primary double row bearing, and transmits power of the in-wheel motor to an external device,
- wherein the secondary bearing supports an end of the motor shaft which is opposite side of the output portion,
- the primary double row bearing comprises:
- inner and outer rings; and
- a plurality of rolling elements provided between the inner and outer rings and comprising:
    - a primary row which is positioned close to the driving portion; and
    - a secondary row which is positioned close to the secondary bearing,
- wherein a point of application of load of primary row is offset towards the output shaft portion side,
- a pitch circle diameter of the primary row is larger than that of secondary row, and
- the pitch circle diameter of the primary row is set such that the point of application of load of the primary row coincides with or gets close to a load point of the output shaft portion.

According to a seventh aspect of the invention, as set forth in the sixth aspect of the invention, it is preferable that the electric motor is an in-wheel motor which is mounted in a rim of a vehicle wheel to drive the vehicle wheel.

According to the sixth aspect of the invention, of the plurality of rolling elements which are arranged in double rows, the point of application of load of the primary row is offset towards the output shaft portion side, the pitch circle diameter of the primary row is made larger than the pitch circle diameter of the secondary row of rolling elements, and the pitch circle diameter of the primary row is set such that the point of application of load of the primary row coincides with or gets close to the load point of the output shaft portion. Therefore, a space between the double rows can be decreased. In addition, an increase in the width of the bearing can be suppressed while enhancing the durability of the primary bearing.

According to the seventh aspect of the invention, the electric motor is the in-wheel motor which is mounted in the rim of the vehicle wheel so as to drive the same wheel. As a result, the width of the double-row bearing can be decreased, so as to realize a decrease in size of the in-wheel motor, thereby making it possible to increase the degree of freedom in designing the interior of the rim.

BRIEF DESCRIPTION OF THE DRAWINGS

FIG. 14 is a diagram which explains a basic configuration of a technique according to the related art.

DETAILED DESCRIPTION OF EXEMPLARY EMBODIMENTS OF THE INVENTION EMBODIMENTS

Embodiments of the invention will be described below based on the accompanying drawings.

First Embodiment

A first embodiment will be described bellow.

Figure 1:
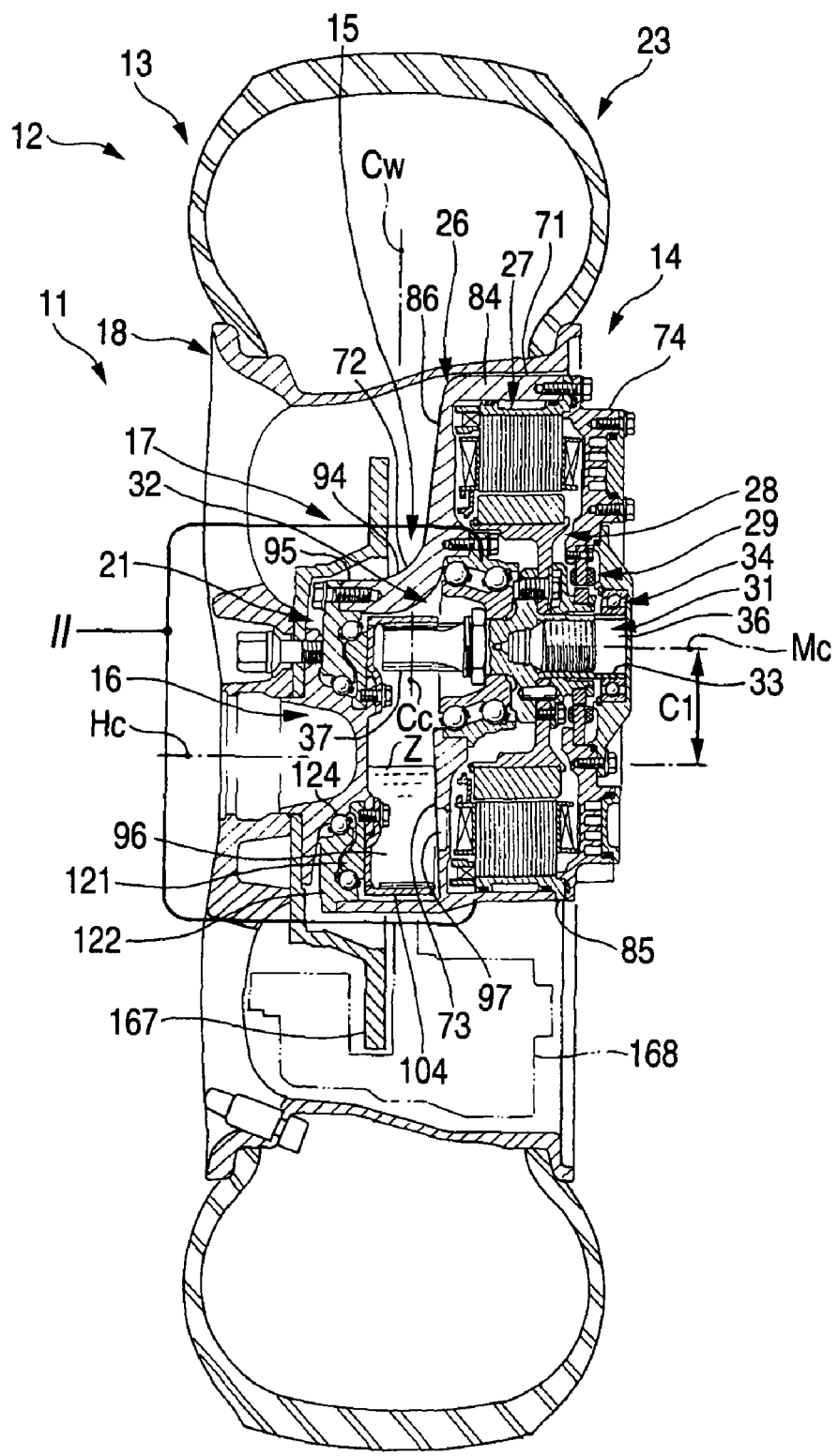
FIG. 1 is a sectional view of a vehicle wheel driving apparatus of the first embodiment of the invention.

FIG. 1 is a sectional view of a vehicle wheel driving apparatus of the first embodiment of the invention.

A vehicle wheel driving apparatus (a road wheel driving unit) 11 is such as to be applied to, for example, a rear road wheel 13 of a vehicle 12 and includes a in-wheel motor 14 which is joined to a vehicle body of the vehicle 12 via a suspension device (not shown), a reduction gear 15 which is a power transmission mechanism connected to the in-wheel motor 14, a hub 16 connected to the reduction gear 15, a disc brake device 17 mounted on the hub 16, a wheel 18 connected to the hub 16, and a rolling bearing 21 which rotatably supports the hub 16. Reference numeral 23 denotes a tire mounted on the wheel 18, and reference character Cw denotes a position which is the center of a width of the wheel 18 and to which the weight of the vehicle is applied.

The in-wheel motor 14 is made up of a motor case 26 which is connected to the suspension device, a stator 27 which is fixed to the motor case 26, a rotor 28 which is disposed rotatably radially inwards of the stator 27, a resolver 29 mounted on the motor case 26, a motor output shaft 31 which is mounted on the rotor 28, a rolling bearing 32 which supports the center of the motor output shaft 31, and a rolling bearing 34 which supports a rear end 33 of the output shaft 31.

Figure 2:
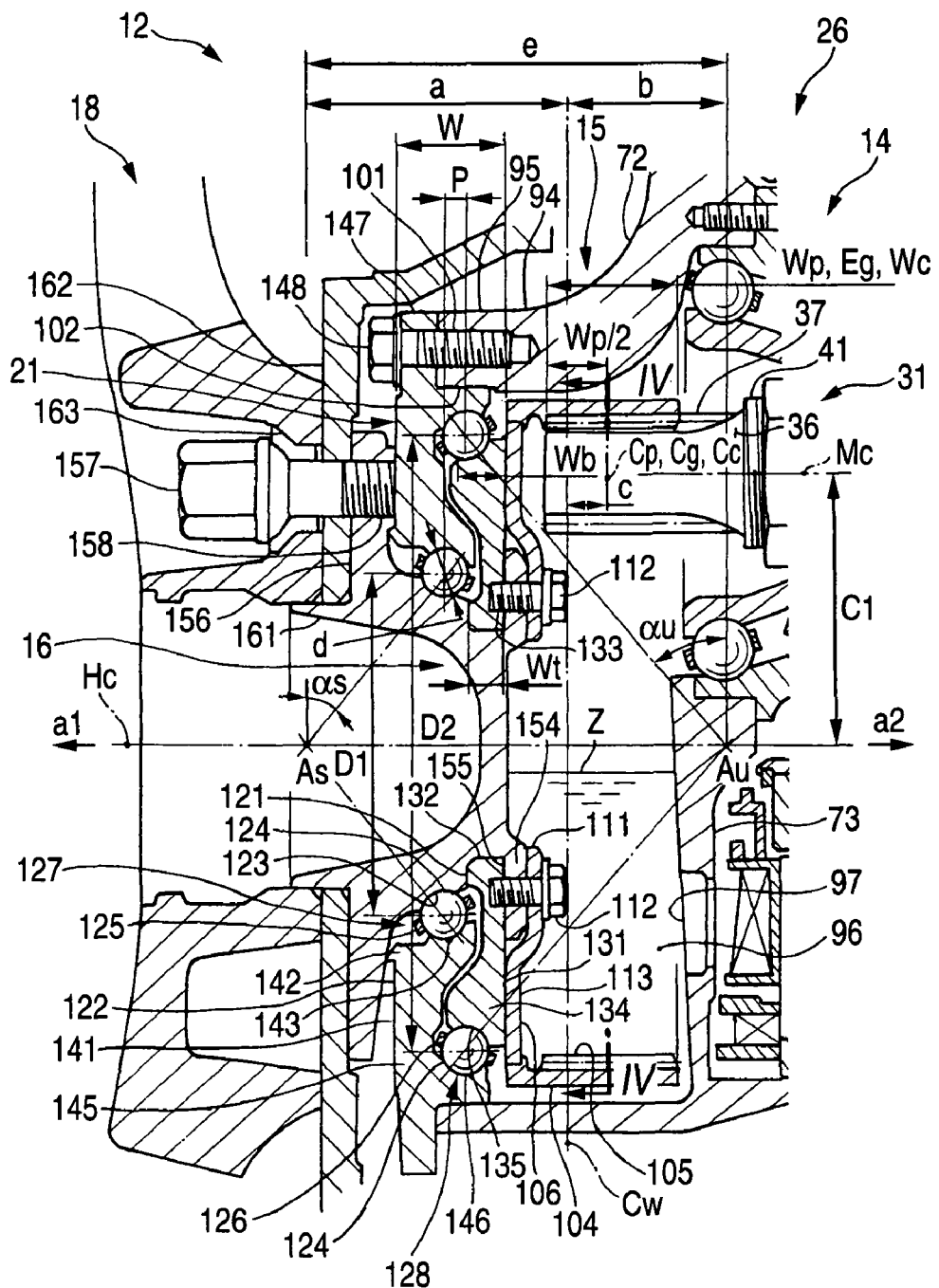
FIG. 2 is a detailed view of a portion denoted by reference numeral II in FIG. 1.

FIG. 2 is a detailed view of an encircled portion denoted by reference numeral II in FIG. 1, which shows a section of the vehicle wheel driving apparatus of the invention and a section of the reduction gear.

Figure 3:
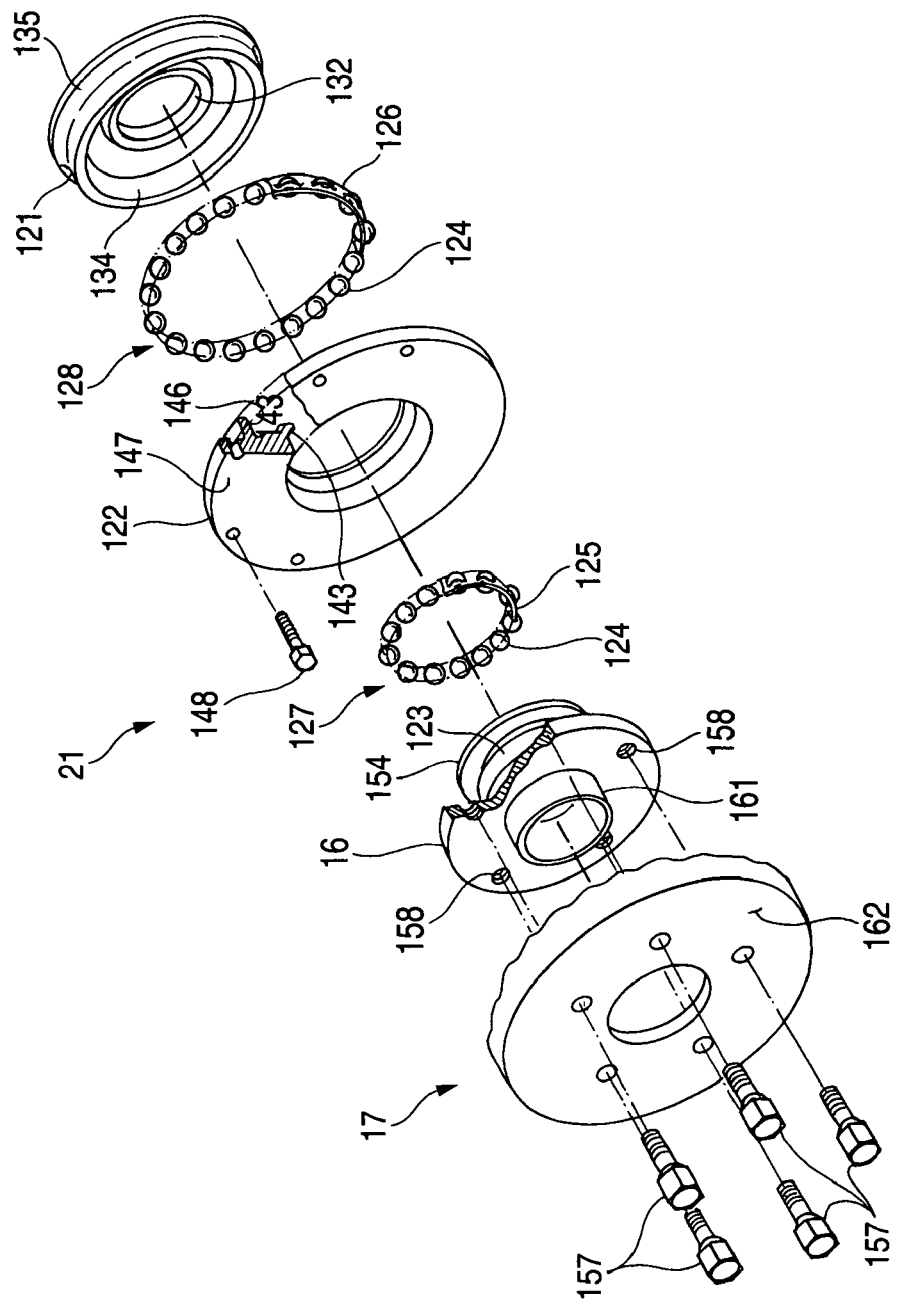
FIG. 3 is an exploded view of a rolling bearing applied to the vehicle wheel driving apparatus of the first embodiment of the invention.

FIG. 3 is an exploded view of the rolling bearing adopted in the vehicle wheel driving apparatus of the invention. FIG. 1 is also used together for the following description.

On the motor output shaft 31, a pinion 37 with a face width Wp is formed on a distal end side of a main body 36, and an externally threaded portion 41 is formed to be adjacent to the pinion 37. A face width center of the face width Wp of the pinion 37 is let to be Cp.

The motor case 26 is a member which is mounted on the suspension device, and also functions as a member which rotatably supports the hub 16 via the rolling bearing 21 and includes a motor accommodation chamber 71 which is disposed on the suspension device side, a gear accommodation chamber 72 which is disposed adjacent to the motor accommodation chamber 71 on a side thereof which lies to face the hub 16, a partition wall 73 which separates both the chambers 71, 72 from each other, and an inner wall 74 which seals an opening in the motor accommodation chamber 71 in such a manner as to face the partition wall 73.

On the gear accommodation chamber 72, a circumferential wall 94 is formed in such a manner as to continuously follow a circumferential wall 84 and an outer wall 86 of the motor accommodation chamber 71, and a bearing supporting portion 95 to which the rolling bearing 21 is fastened is formed at an open end of the circumferential wall 94. In addition, an oil reservoir portion 96 is defined by forming a wall by the rolling bearing 21 and the hub 16, and an oil flow path 97 is opened in the partition wall 73 for allowing a lubricating oil Z to be led into the motor accommodation chamber 71.

An internally threaded portion 101 and a positioning annular portion 102 are formed in the bearing supporting portion 95.

The reduction gear 15 is made up of the pinion 37 and an internal gear 104 which is a driven portion which is made to mesh with the pinion 37, and a rotational axis center Mc of the motor output shaft 31 of the in-wheel motor 14 is offset by a distance C1 relative to a rotational axis center Hc of the wheel 18.

The internal gear 104 is made up of an internal gear main body 105 which is made to mesh with the pinion 37 over a contact face width Wc and a disc 106 which is integrally fixed to a circumferential edge of the internal gear main body 105. The internal gear main body 105 is formed to have a face width Wg, and a face width center of the face width Wg is let to be Cg, this face width center Cg being made to coincide with the face width center Cp of the pinion 37.

The contact face width Wc is the same as the face width Wp of the pinion 37, and a face width center Cc of the contact face width Wc coincides with the face width center Cp of the pinion 37.

On the disc 106, a hub mounting portion 111, on which the hub 16 and the rolling bearing 21 are mounted in a superposed fashion, is formed in the center, and a bearing supporting portion 113 is formed to support the rolling bearing 21 by mounting the hub mounting portion 111 with bolts 112 . . . and bringing the rolling bearing 21 into abutment therewith radially outwards with the rolling bearing 21 made to continuously follow the hub 111.

The rolling bearing 21 is a bearing which supports the hub 16 rotatably and is made up of an inner bearing ring 121 which is an inner ring, an outer bearing ring 122 which is an outer ring, a hub raceway groove 123 formed on an outer circumferential surface of the hub 16, rolling elements 124 . . . , and cages 125, 126.

In addition, in the rolling bearing 21, there is a primary ball row 127 (the primary row) in which the rolling elements 124 . . . are arranged along a pitch circle having a primary pitch circle distance D1. Also, there is a secondary ball row (the secondary row on the driven portion side) 128 in which the rolling elements 124 . . . are arranged along a pitch circle having a secondary pitch circle distance D2 are provided. The secondary pitch circle diameter D2 is made larger than the primary pitch circle diameter D1. The secondary ball row 128 is made to get closed to the primary ball row 127 which is disposed further outboards (in a direction indicated by an arrow a1) of the vehicle 12 than the secondary ball row 128 to thereby produce a pitch P, so that the rolling elements (balls) 124 are made to overlap each other by the pitch P, whereby the rolling bearing 21 is made to have a bearing width W. Here, while the pitch P coincides with the overlapping amount of the primary ball row 127 and the secondary ball row 128, the ball rows may be made to get closer to each other (to overlap each other further) so as to reduce the overlapping amount (here, P).

The bearing width W is, for example, double of a spherical diameter d of the rolling element 124. The bearing width W may be increased or decreased in accordance with a condition such as load.

The pitch P is, for example, one-half the spherical diameter d of the rolling element 124. The pitch P may be increased or decreased in accordance with the condition such as load.

In the hub raceway groove 123 formed on the outer circumferential surface of the hub 16, a contact angle is set to αs.

On the inner bearing ring 121, a fastening table portion 132 is formed on an inner circumferential portion of an inner ring main body 131 for a rotary member such as the hub 16 or the internal gear 104 to be fastened thereto. The fastening table portion 132 is formed with a width Wt which is smaller than the spherical diameter d of the rolling element 124, Internally threaded portions 133 . . . are formed in the fastening table portion 132. In addition, a raceway portion 134 is formed on an outer circumferential portion of the inner bearing ring 121 in such a manner as to continuously follow the fastening table portion 132. The raceway portion 134 is formed with a width Wb which is substantially the same as the spherical diameter d of the rolling element 124. Then, a raceway groove 135 is formed in a corner of the raceway portion 134, and a contact angle is set to αu.

On the outer bearing ring 122, a raceway portion 142 is formed on an inner circumferential portion of an outer ring main body 141. A raceway groove 143 is formed on the raceway portion 142 in such a manner as to face the hub raceway groove 123 of the hub 16. A raceway portion 145 is formed radially outwards of the raceway portion 142 in such a manner as to continuously connect thereto. A raceway groove 146 is formed on the raceway portion 145 in such a manner as to face the raceway groove 135 of the inner bearing ring 121. A fastening flange 147, which is fixed to a stationary member such as the motor case 26, is formed on an outer circumferential portion of the outer ring main body 141 which also functions as the raceway portion 145. The fastening flange 147 is mounted on the bearing supporting portion 95 of the gear accommodation chamber 72 with bolts 148 . . . . As this occurs, the internal gear 104 and the hub 16 are fastened together with the bolts 112 . . . in advance.

Briefly speaking, although the rolling bearing 21 is configured to have the bearing width W, the contact angle αs and the contact angle αu, which have been described above, as well as points of application of load As, Au and a distance e defined between the points of application of load As, Au, here, as the bearing of the hub, the point of application of load Au is set in a position which stays away outwards (in the direction indicated by the arrow a) from the center Cw of the width of the wheel 18 by a distance a, while the point of application of load As is set in a position which stays away inwards (in a direction indicated by an arrow a2) from the center Cw of the width of the wheel 18 by a distance b. In addition, the width center Cc of the contact face width Wc of the reduction gear 15 is disposed in a position which stays away inwards from the center Cw of the width of the wheel 18 by a distance c (c<b).

A "width center side of the vehicle 12" means the same as the inside thereof and denotes the direction indicated by the arrow a2.

On the hub 16, a connecting portion (the side portion of the hub) 154 is formed to which the internal gear 104 is integrally connected, and a bearing fitting groove 155 is formed in such a manner as to continuously follow the connecting portion 154. The hub raceway groove 123, which has been described above, is formed on the outer circumferential of the hub 16 in such a manner as to continuously follow the bearing fitting groove 155, and a wheel fastening portion 156 is formed in such a manner as to continuously follow the hub raceway groove 123. Internally threaded portions 158 . . . into which wheel bolts 157 . . . are screwed are formed in the wheel fastening portion 156, and a positioning projecting portion 161 is formed outwards (in the direction indicated by the arrow a1) of the wheel fastening portion 156 in such a manner as to continuously follow the same portion. Then, a disc portion 162 of the disc brake device 17 and a disc portion 163 of the wheel 18 are fitted on the positioning projecting portion 161 in a superposed fashion, and by applying axial force of the wheel bolts 157 to the disc portions 162, 163 which are so superposed one on the other, the disc portions 162, 163 are supported on the hub 16.

In the figures, reference numeral 167 denotes a brake disc and 168 a caliper which applies the brake to the brake disc 167 by holding the brake disc 167 therein.

Figure 4:
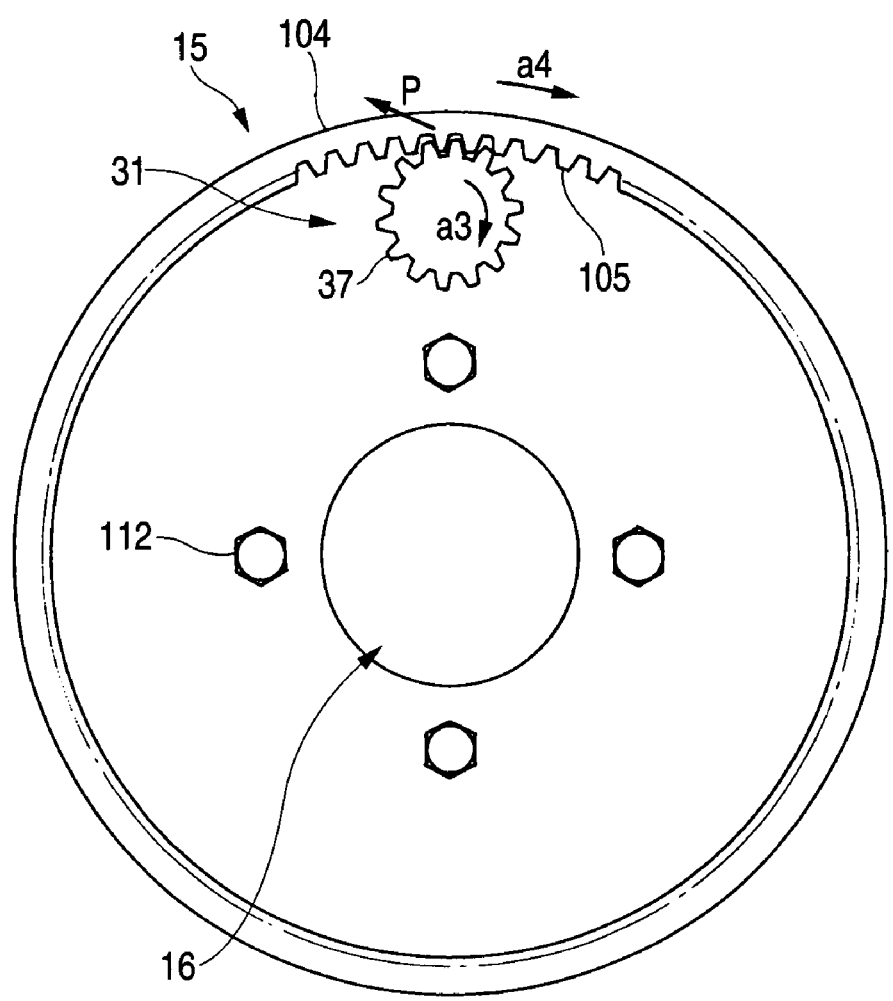
FIG. 4 is a sectional view taken along the line IV-IV in FIG. 2, which also indicates a primary function diagram.

FIG. 4 is a sectional view taken along the line IV-IV in FIG. 2, and also indicates a primary function diagram.

In the reduction gear 15, the internal gear 104 is caused to mesh with the pinion 37, and the pinion 37 is rotated in a direction indicated by an arrow a3. Then, the internal gear 104 rotates in a direction indicated by an arrow a4. As this occurs, a reaction force P is produced in the internal gear 104, and the reaction force P so produced is then applied to the rolling bearing 21 (refer to FIG. 5).

Figure 5:
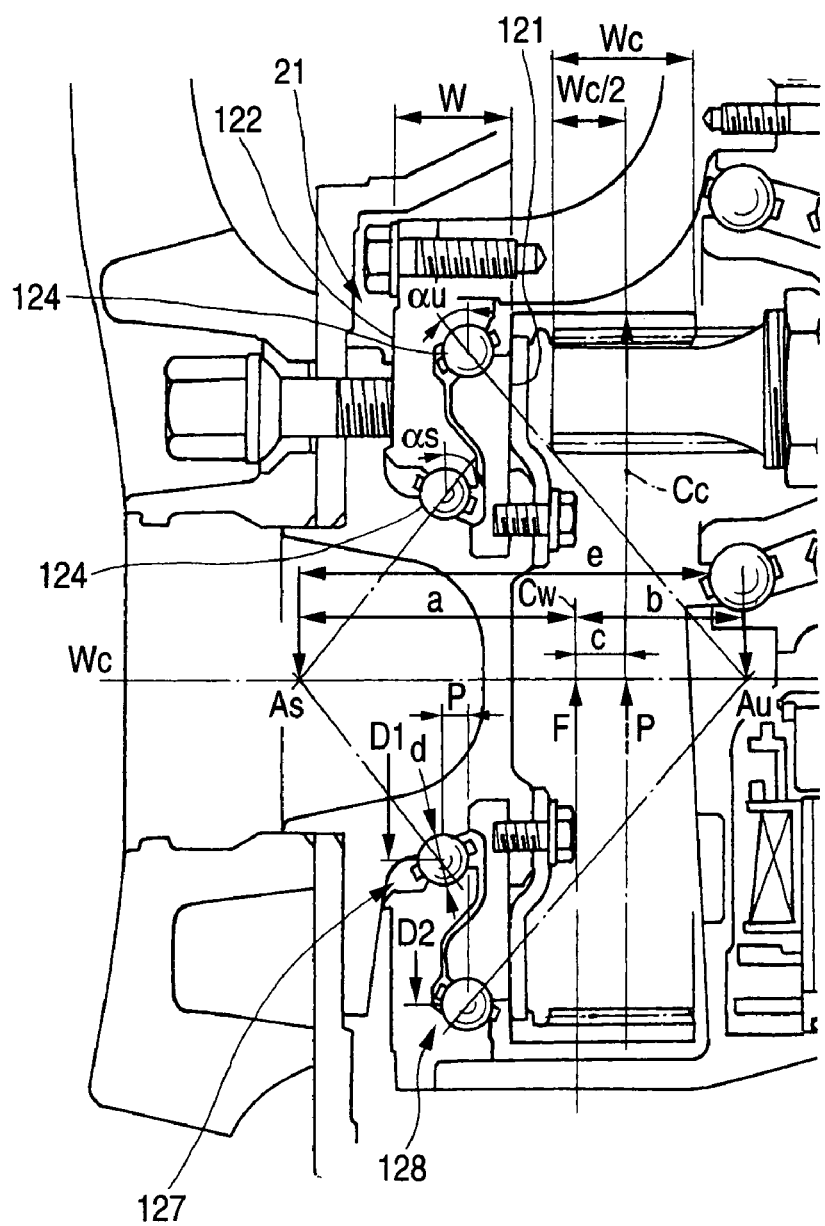
FIG. 5 is a secondary function diagram of the vehicle wheel driving apparatus of the first embodiment of the invention.
Figure 6:
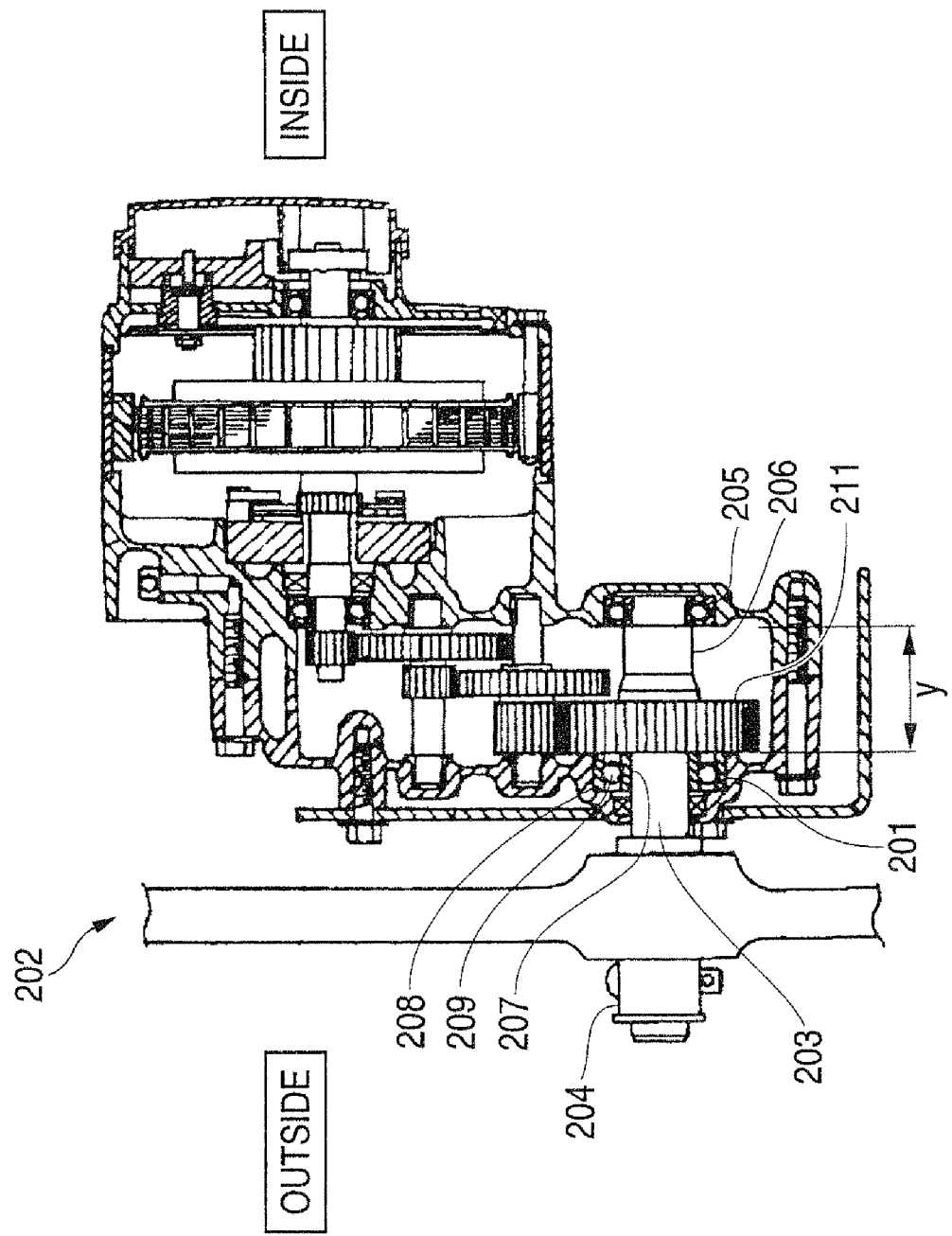
FIG. 6 is an explanatory diagram which explains a basic configuration of a technique according to the related art.

FIG. 5 is a secondary function diagram of the vehicle wheel driving apparatus of the invention. Here, FIG. 1 is also used together for the following description.

In the rolling bearing 21, the primary ball row 127 is arranged with the primary pitch circle diameter D1 and the secondary row 128 is arranged with the secondary pitch circle diameter D2 between the inner bearing ring 121 and the outer bearing ring 122, and the secondary pitch circle diameter D2 is made larger than the primary pitch circle diameter D1, so that the primary ball row 127 and the secondary ball row 128 overlap each other by the pitch P in the radial direction. Therefore, the wearing width W of the rolling bearing 21 becomes twice the spherical diameter d of the rolling element 124, thereby making it possible to decrease the bearing width W of the rolling bearing 21.

In addition, the rolling bearing 21 is configured to have the bearing width W of the rolling bearing 21, the contact angle αu, the contact angle αu, the points of application of load As, Au and the distance e defined between the points of application of load As, Au by the arrangement of the inner bearing ring 121 and the outer bearing ring 122, whereby a load F of the vehicle weight (for example, ¼ of the vehicle weight) is made to be applied to the center of the distance e defined between the points of application of load As, Au and the reaction force P of the driving force is made to be applied to the center of the distance e defined between the points of application of load As, Au, more particularly, to the position which stays away from the center Cw of the width of the wheel 18 by the distance c. Therefore, even though the bearing width W of the rolling element 21 is decreased, the loads (the load F, the reaction force P) can be supported substantially uniformly, thereby making it possible to secure the life of the rolling bearing 21.

In this way, in the vehicle wheel driving apparatus 11, the plurality of balls (rolling elements) 124 are arranged in an annular fashion, and the balls 124 so arranged are held by the inner and outer bearing rings 121, 122. In addition, the plurality of balls 124 are arranged along the pitch circle having the primary pitch circle diameter D1 so as to form the primary ball row 127, and the remaining of the plurality of rolling elements 124 are arranged along the pitch circle having the secondary pitch circle diameter D2 so as to form the secondary ball row 128. Furthermore, the secondary pitch circle diameter D2 is made larger than the primary pitch circle diameter D1. By this configuration, the secondary ball row 128 having the larger pitch circle diameter can be made to get close to the primary ball row 127 having the smaller pitch circle diameter D1, thereby making it possible to decrease the bearing width W of the rolling bearing 21.

In addition, the secondary ball row 128 is disposed radially outwards of the primary ball row 127 in such a manner as to overlap thereabove. Therefore, the bearing width W of the rolling bearing ring 21 can be decreased further, thereby making it possible to realize a further decrease in the bearing width.

The point of application of load As of the primary ball row 127 is set outboards and the point of application of load Au of the secondary ball row 128 is set inboards. Therefore, even though the bearing width W of the rolling bearing 21 is decreased, the distance e defined between the points of application of load is increased, so as to decrease the loads applied to the rolling bearing 21, thereby making it possible to secure the life of the rolling bearing 21.

The primary and secondary ball rows 127, 128 are used to support the hub 16 rotatably, and the secondary ball row 128 is disposed on the width center side of the vehicle 12 (in the direction of the arrow a2) relative to the primary ball row 127. Therefore, the bearing width W of the rolling bearing 21 can be decreased, thereby making it possible to enhance the degree of freedom in designing the interior of the wheel 18 which is mounted on the hub 16.

In addition, for example, in the event that the in-wheel motor 14 is incorporated within the wheel 18, the reaction force P, which is produced when driving the wheel 18 to which the load F, which is equal to ¼ of the vehicle weight, is being applied, can be received between the points of application of load As, Au. As a result, even though the bearing width W of the rolling bearing 21 used on the hub 16 is decreased, the life of the rolling bearing element 21 of the hub 16 can be secured.

On the gear accommodation chamber 72, the circumferential wall 94 is formed in such a manner as to continuously follow the circumferential wall 84 and the outer wall 86 of the motor accommodation chamber 71, and the bearing supporting portion 95 to which the rolling bearing 21 is fastened is formed at the open end of the circumferential wall 94. In addition, the oil reservoir portion 96 is defined by forming the wall by the rolling bearing 21 and the hub 16, and the oil flow path 97 is opened in the partition wall 73 for allowing the lubricating oil Z to be led into the motor accommodation chamber 71. Therefore, the lubricating oil Z can be supplied to the rolling bearings 21, 32. Consequently, there is no need to provide a grease reservoir for reserving grease therein, a sealing member for grease and the like on the rolling bearing 21.

As is shown in FIGS. 2, 3, when mounting the wheel 18, by screwing the wheel bolts 157 into the internally threaded portions 158 which are cut into the hub 16, the wheel 18 can be mounted on the hub 16. Here, the wheel 18 is mounted while being superposed on the disc portion 162 of the disc brake device 17.

Namely, the hub 16 includes the connecting portion 154 to which the internal gear 104 is integrally connected, the wheel fastening portion 156 which is formed in such a manner as to continuously follow the connecting portion 158 side, the internally threaded portions 158 . . . formed in the wheel fastening portion 156 and the wheel bolts 157 . . . which are screwed into the internally threaded portions 158 so as to fasten the wheel 18 to the wheel fastening portion 156. Therefore, there is no need to fix the wheel bolts 157 . . . by erecting them with clamps, and head portions of the clamps do not project inwards (in the direction indicated by the arrow a2) from the rear of the hub 16. Consequently, the bearing width W of the rolling bearing 21 can be decreased in a more ensured fashion.

Note that while in this embodiment, the vehicle wheel driving apparatus of the invention has been described mainly on the hub of the in-wheel motor, the invention can be applied to various rotary components which are provided on mechanical devices, and the invention may be applied to general industrial machines.

The vehicle wheel driving apparatus of the invention is preferably applied to the hub of an in-wheel motor which is fitted on a vehicle.

Second Embodiment

Next, second embodiment of the invention will be described below based on the accompanying drawings.

Figure 7:
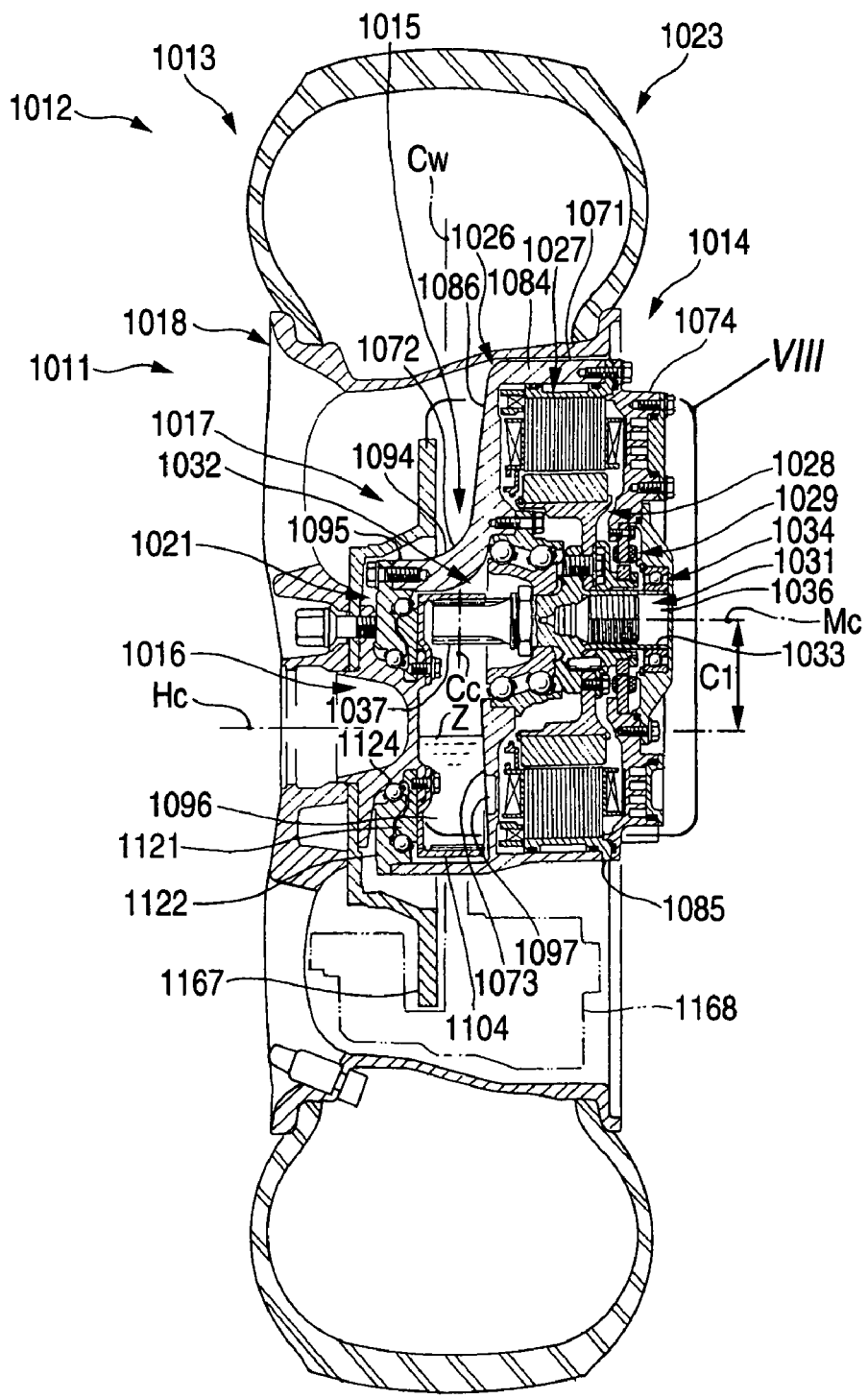
FIG. 7 is a sectional view of a road wheel driving unit which utilizes an electric motor of the second embodiment of the invention.

FIG. 7 is a sectional view of a road wheel driving unit which utilizes an electric motor of the second embodiment of the invention.

A road wheel driving unit 1011 is such as to be applied to, for example, a rear road wheel 1013 of a vehicle 1012 and includes a electric motor 1014 which is joined to a vehicle body of the vehicle 1012 via a suspension device (not shown), a reduction gear 1015 connected to the electric motor 1014, a hub 1016 connected to the reduction gear 1015, a disc brake device 1017 mounted on the hub 1016, a wheel 1018 connected to the hub 1016, and a rolling bearing 1021 which supports rotatably the hub 1016. Reference numeral 1023 denotes a tire mounted on the wheel 1018, and reference character Cw denotes a position which is the center of a width of the wheel 1018 and to which the weight of the vehicle is applied.

The electric motor 1014 is an in-wheel motor and is made up of a motor case 1026 which is connected to the suspension device, a stator 1027 which is fixed to the motor case 1026, a rotor 1028 which is disposed rotatably radially inwards of the stator 1027, a resolver 1029 mounted on the motor case 1026, a motor output shaft 1031 which is mounted on the rotor 1028, a rolling bearing 1032 which is a primary bearing supporting the center of the motor output shaft 1031, and a rolling bearing 1034 which is a secondary bearing supporting a rear end 1033 of the output shaft 1031.

Figure 8:
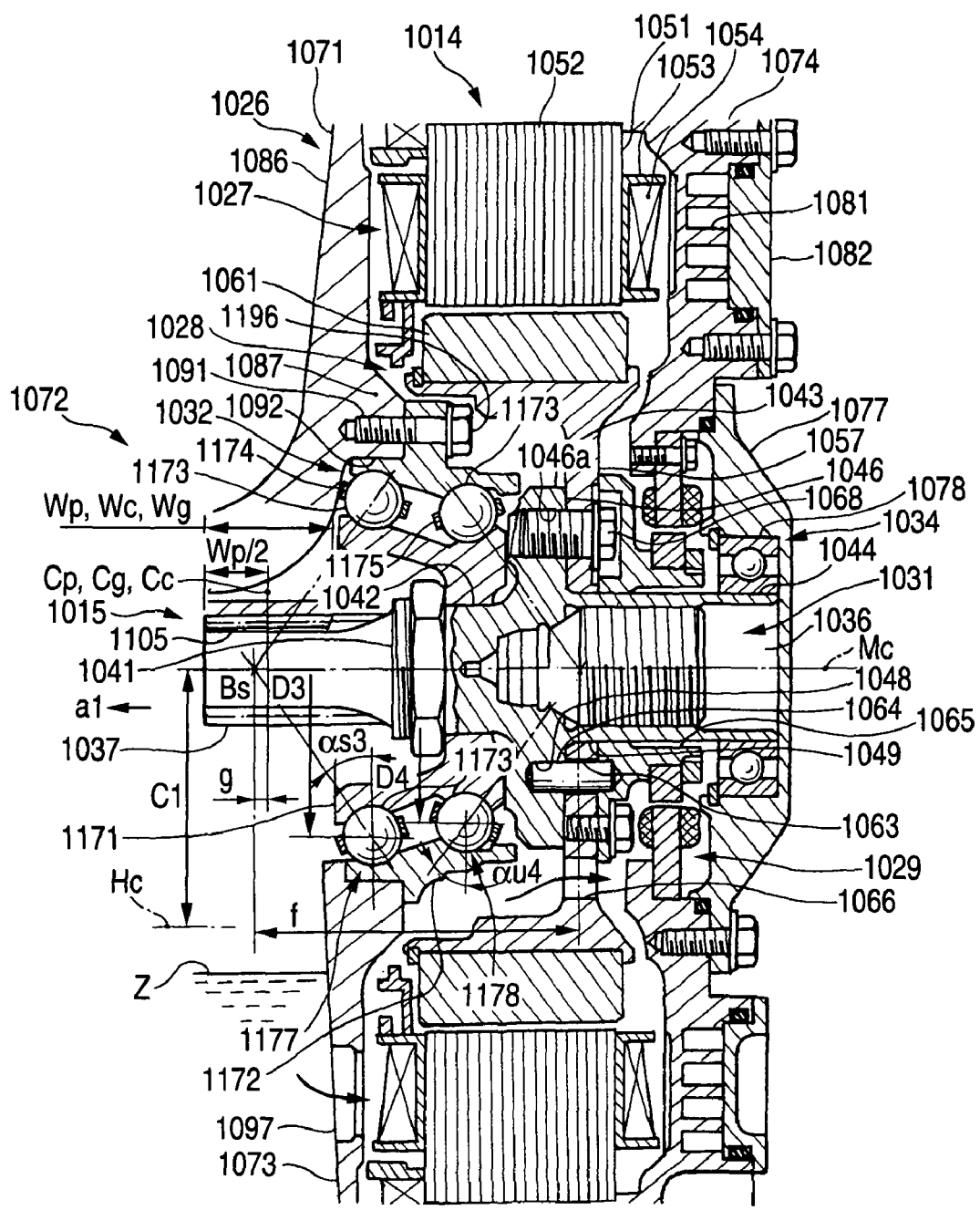
FIG. 8 is a detailed view of a portion denoted by reference numeral VIII in FIG. 7.

FIG. 8 is a detailed view of an encircled portion denoted by reference numeral II in FIG. 7, which shows a section of the electric motor of the second embodiment of the invention and a section of the reduction gear. FIG. 7 is also used together for the following description.

The motor output shaft 1031 is a shaft configured such that an output shaft portion (a pinion) 1037 with a face width Wp is formed on a distal end side of a main body 1036, an externally threaded portion 1041 is formed to be adjacent to the pinion 1037, a central bearing portion 1042 is formed adjacent to the externally threaded portion 1041, a shaft flange portion 1043 is formed in such a manner as to continuously follow the central bearing portion 1042, and a rear end bearing portion 1044 is formed at the rear end 1033 of the main body 1036 into which the rolling bearing 1034 is fitted.

A face width center of a face width Wp of the pinion 1037 is let to be Cp.

A length LP (refer to FIG. 9) given to the central bearing portion 1042 is a width in which a rolling element 1173 having a spherical diameter d1 (refer to FIG. 7) can be held, and therefore, the length of the central bearing portion 1042 is for example the width of a single-row bearing.

The shaft flange portion 1043 is a portion which is configured such that a rotary member mounting portion 46 is formed on which the rotor 1028 is mounted, internally threaded portions 1046a . . . ( . . . denotes the plurality. This will be true hereinafter) and a reference recessed portion 1046b (refer to FIG. 9A) are formed in the rotary member mounting portion 46. Additionally, a positioning hole 1048 is formed in the rotary member mounting portion 1046, and a positioning shaft portion 1049 is formed in such a manner as to continuously follow the rotary member mounting portion 1046.

The stator 1027 has a plurality of coil portions 1051 . . . , and the coil portions 1051 . . . are each an electric element which is made up of an iron core 1052, a coil bobbin 1053 and a winding 1054.

Figure 10:
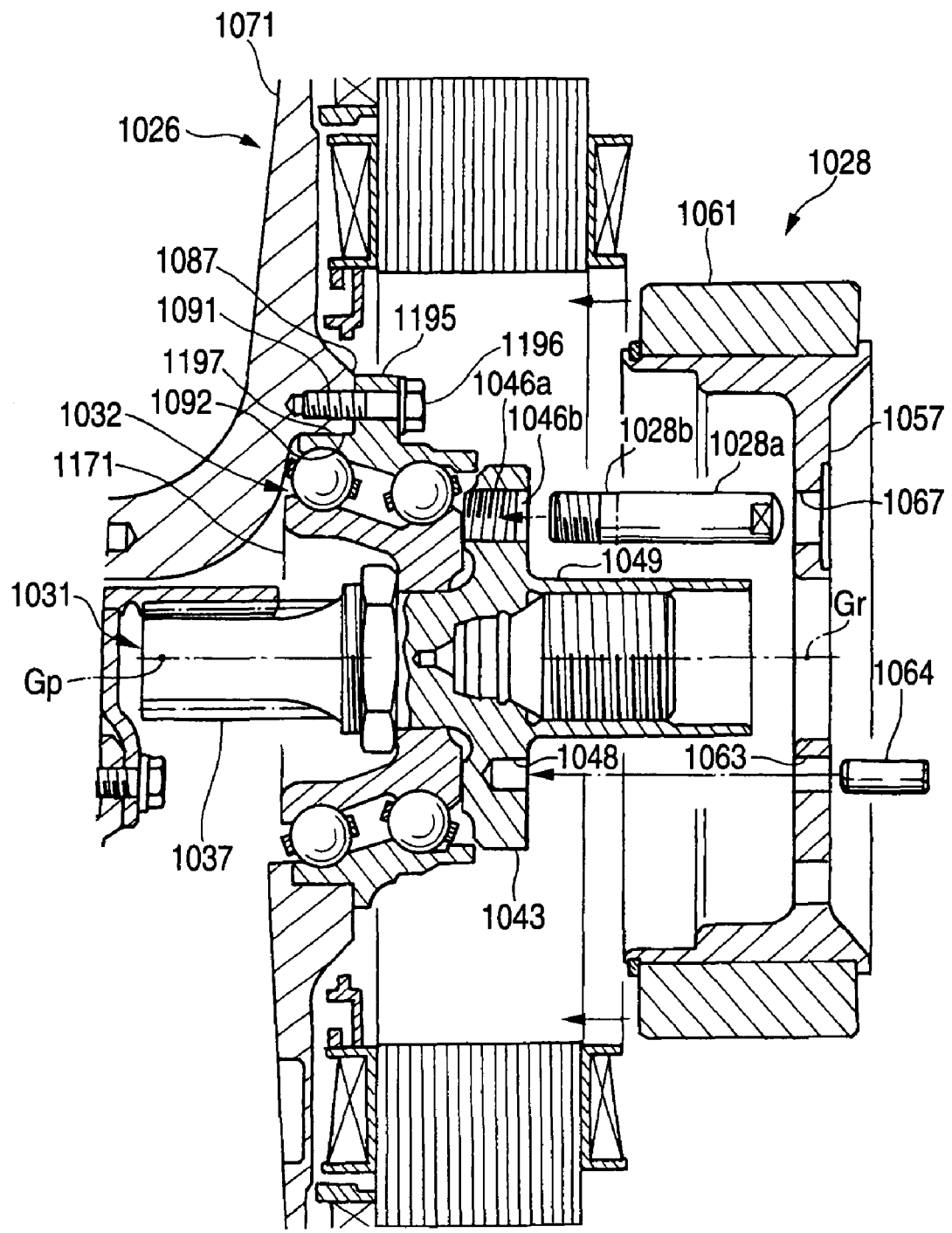
FIG. 10 is a primary diagram which explains a state where a rotor is assembled which is provided on the electric motor of the second embodiment of the invention.

The rotor 1028 includes a disc portion 1057 which is fitted on the positioning shaft portion 1049 of the output shaft 1031 so as to be mounted on the rotary member mounting portion 1046 of the shaft flange portion 1043, permanent magnets 1061 . . . which are mounted on an outer circumferential portion of the disc portion 1057, a positioning hole 1063 opened in the disc portion 1057, a pin 1064 which fits in the positioning hole 1063 and the positioning hole 1048 in the shaft flange portion 1043, a ring member 1065 which fits on the pin 1064 and the positioning shaft portion 1049 and fixes part of the resolver 1029, a lubricating hole 1066, and bolt holes 1067 . . . which double as guide holes (refer to FIG. 10). Reference numeral 1068 denotes bolts . . . which are screwed into the internally threaded portions 1046a.

The resolver 1029 is a sensor which can detect magnetic pole position, speed and rotational position.

The motor case 1026 is a member which is mounted on the suspension device, and also functions as a member which rotatably supports the hub 1016 via the rolling bearing 1021 and includes a motor accommodation chamber 1071 which is disposed on the suspension device side, a gear accommodation chamber 1072 which is disposed adjacent to the motor accommodation chamber 1071 on a side thereof which lies to face the hub 1016, a partition wall 1073 which separates both the chambers 1071, 1072 from each other, and an inner wall 1074 which seals an opening in the motor accommodation chamber 1071 in such a manner as to face the partition wall 1073.

On the inner wall 1074, a central supporting table 1077 is formed, a bearing recessed portion 1078 is formed on an inner surface of the central supporting table 1077 into which the rolling bearing 1034 is fitted, coolant paths 1081 are formed in an outer surface of the inner wall 1074, and the coolant paths 1081 so formed is sealed off by a lid 1082.

In the motor accommodation chamber 1071, a water-cooling ring 1085 is fitted in an inner surface of a circumferential wall 1084 which continuously follows the opening, the coil portions 1051 . . . of the stator 1027 are brought into contact with the cooling ring 1085, and a bearing supporting portion 1087 is formed on an inner surface of an outer wall 1086 and an inner circumferential edge of the partition wall 1073 to which the rolling bearing 1032 is fastened.

Internally threaded portions 1091 . . . and a bearing fitting portion 1092 are formed on the bearing supporting portion 1087.

On the gear accommodation chamber 1072, an oil reservoir portion 1096 is defined by forming a wall by the rolling bearing 1021 and the hub 1016, and an oil flow path 1097 is opened in the partition wall 1073 for allowing a lubricating oil Z to be led into the motor accommodation chamber 1071.

The reduction gear 1015 is made up of the pinion 1037 and an internal gear 1104 which is made to mesh with the pinion 1037, and a rotational axis center Mc of the motor output shaft 1031 of the in-wheel motor 1014 is offset by a distance C1 relative to a rotational axis center Hc of the wheel 1018.

The internal gear 1104 has an internal gear main body 1105 which meshes with the pinion 1037 over a contact face width Wc. The internal gear main body 1105 is formed to have a face width Wg, and a face width center of the face width Wg is let to be Cg, this face width center Cg being made to coincide with the face width center Cp of the pinion 1037.

The contact face width Wc is the same as the face width Wp of the pinion 1037, and a face width center Cc of the contact face width Wc coincides with the face width center Cp of the pinion 1037.

The rolling bearing 1021 is a bearing which supports the hub 1016 rotatably and includes an inner bearing ring 1121, an outer bearing ring 1122, and rolling elements 1124 . . . (balls).

The rolling bearing 1032 is a bearing which supports the motor shaft 1031 rotatably and includes an inner bearing ring 1171 (an inner ring) with a fastening portion, an outer bearing ring 1172 (an outer ring) with a fastening portion, rolling elements 1173 . . . (balls), and cages 1174, 1175.

In addition, the rolling bearing 1032 is such that the rolling elements 1173 . . . are arranged along a pitch circle having a primary pitch circle diameter D3 into a primary ball row 1177, the rolling elements 1173 . . . are arranged along a pitch circle having a secondary pitch circle diameter D4 into a secondary ball row 1178, and the primary pitch circle diameter D3 is made larger than the secondary pitch circle diameter D4.

Figure 9A:
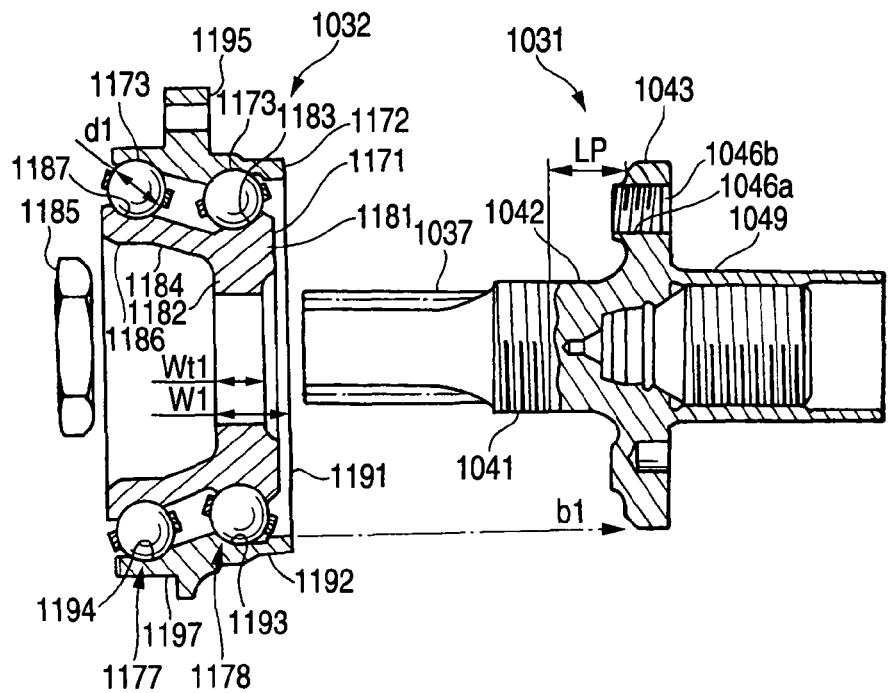
FIG. 9A is a diagram which explains a state where a rolling bearing is assembled which is provided on the electric motor of the second embodiment of the invention.
Figure 9B:
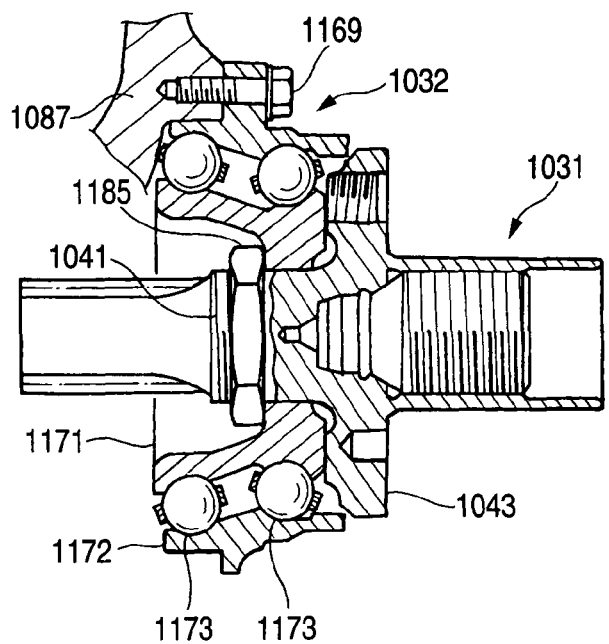
FIG. 9B is a diagram which explains a state where a rolling bearing is assembled which is provided on the electric motor of the second embodiment of the invention.

FIGS. 9A, 9B are explanatory diagrams which illustrate a state where the rolling bearing provided on the electric motor of the invention is assembled. Firstly, referring also to FIG. 8, the inner bearing ring 1171 with a fastening portion and the outer bearing ring 1172 with a fastening portion of the rolling bearing 1032 will be described specifically.

The inner bearing ring 1171 with a fastening portion is formed so that fastening table portion 1182 is formed on an inner circumferential portion of an inner ring main body 1181 with a width Wt substantially the same as the spherical diameter d1 of the rolling element 1173. The fastening table portion 1182 fastens the inner bearing ring 1171 with the fastening portion to the motor shaft 1031. Further, the inner bearing ring 1171 with the fastening portion is formed so as to have a diameter with which the inner bearing ring 1171 can fit on the central bearing portion 1042 of the motor shaft 1031. A raceway groove 1183 is formed on an outer circumferential portion of the fastening table portion 1182 with a contact angle set to $\alpha u4$. A cylindrical portion 1186 is formed with a diameter which can avoid interference with a tool that is used on a nut 1185 in such a manner as to continuously follow the raceway groove 1183. A raceway groove 1187 is formed on a raceway portion 1186 with a contact angle set to $\alpha s3$.

On the outer bearing ring 1172 with a fastening portion, a raceway portion 1192 is formed on an outer ring main body 1191. A raceway groove 1193 is formed on an inner circumferential portion of the raceway portion 1192 in such a manner as to face the raceway groove 1183 of the inner bearing ring 1171 with a fastening portion, while a raceway groove 1194 is formed on the inner circumferential portion of the raceway portion 1192 in such a manner as to face the raceway groove 1187 of the inner bearing ring 1171 with a fastening portion. A fastening flange 1195 is formed on an outer circumferential portion of the outer ring main body 1191 which is fixed to the motor case 1026, and the fastening flange 1195 is mounted on the bearing supporting portion 1087 of the motor accommodating chamber 1071 with bolts 1196 . . . . As this occurs, the rolling bearing 1032 is fastened to the central bearing portion 1042 of the motor shaft 1031 in advance with a nut 1185.

A fitting portion 1197 is formed on the fastening flange 1195.

Here, a width over which the rolling bearing 1032 is fixedly fitted on to the motor shaft 1031 is let to be W1, and this width W1 is made to be a bearing width (an assembled bearing width) of the rolling bearing 1032.

The width W1 of the rolling bearing 1032 corresponds to a bearing width of a single-row bearing. The bearing width of a single-row bearing takes a general value (refer to, for example, a catalog of a manufacturer).

Here, briefly speaking, although the rolling bearing 1032 is made to have the contact angle αs3 and the contact angle αu4, which have already been described, as well as load applied points (points of application of load) Bs, Bu and a distance f defined between the load applied points Bs, Bu, here, as the bearing of the in-wheel motor 1014, the point of application of load Bs is set to a position which stays away outwards, which is outside (in a direction indicated by an arrow a1), from the face width center Cc of the contact face width Wc by a distance g.

Next, a state will be described where the rolling bearing is assembled.

(a): Firstly, the rolling bearing 1032 is mounted on the motor shaft 1031. The fastening table portion 1182 of the inner bearing ring 1171 with a fastening portion is fitted on the central bearing portion 1042 of the motor shaft as indicated by an arrow b1. Then, the nut 1185 is screwed on to the externally threaded portion 1041 with for example a predetermined torque (refer to FIG. 9B), whereby the assemblage of the rolling bearing 1032 on to the motor shaft 1031 is completed.

(b) Following (a) above, the rolling bearing 1032, in which the motor shaft 1031 is fastened to the inner bearing ring 1171 with a fastening portion with the nut 1185, is mounted in the bearing supporting portion 1087 of the motor accommodation chamber 1071 with the bolts 1196 . . . .

FIG. 10 is a primary diagram which explains a state where the rotor provided on the electric motor of the invention is assembled.

The fitting portion 1197 of the fastening flange 1195 fits in the bearing fitting portion 1092 of the bearing support portion 1087, whereby the concentricity of the motor shaft 1031 can be secured.

Next, the assemblage of the rotor 1028 will be described.

After the concentricity of the motor shaft 1031 has been secured, the rotor 1028 is fixed with the bolts 1068.

To describe specifically, firstly, a guide pin 1028a is screwed into the internally threaded portion 1046a, whereby a reference shaft portion 1028b of the guide pin 1028a is fitted in the reference recessed portion 1046b. At least three guide pints 1028a are desirably used.

Figure 11:
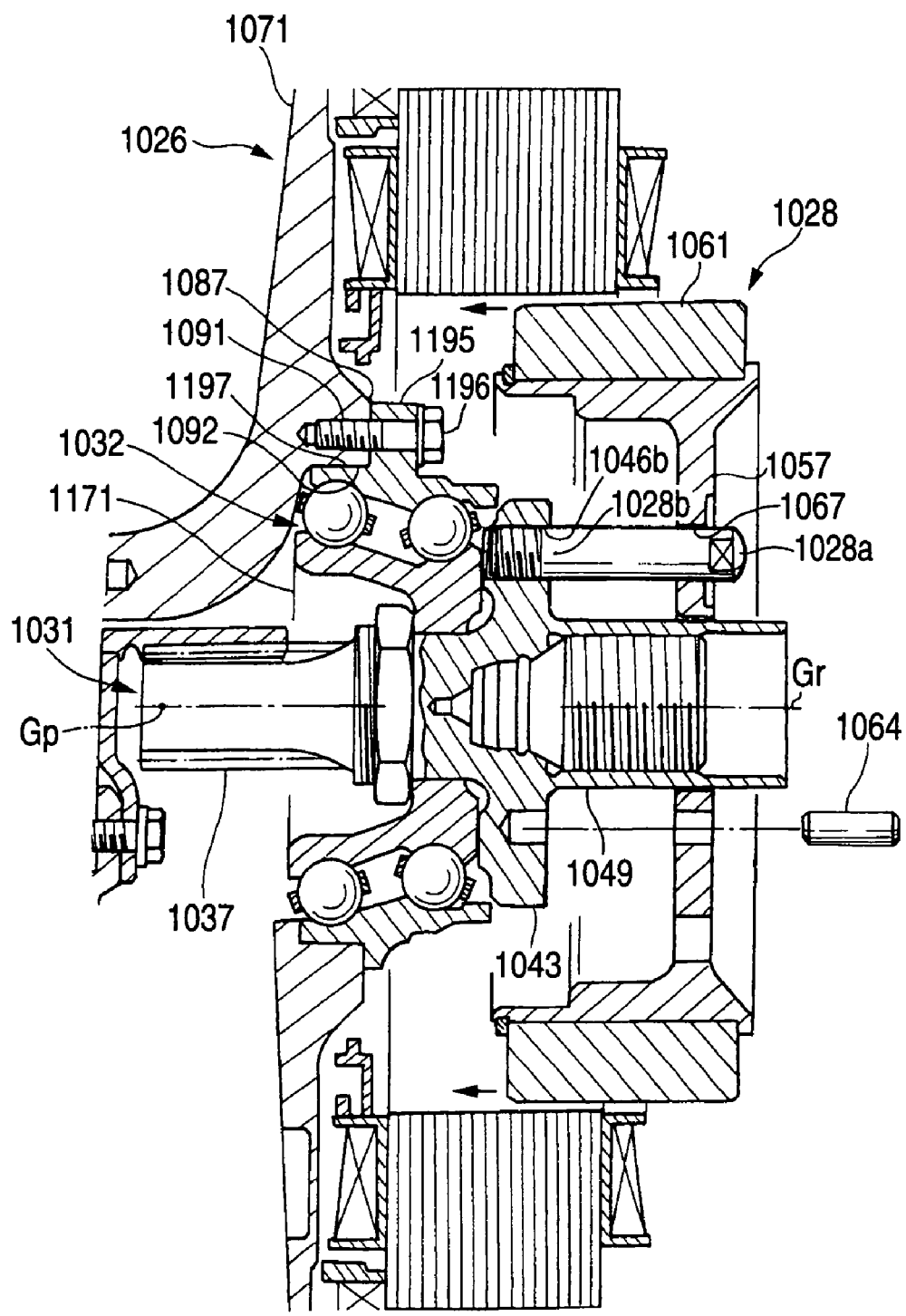
FIG. 11 is a secondary diagram which explains a state where the rotor is assembled which is provided on the electric motor of the second embodiment of the invention.

FIG. 11 is a secondary diagram which explains a state where the rotor provided on the electric motor of the invention is assembled.

Following the operation described above, the bolt hole 1067 which also functions as the guide hole in the rotor 1028 is fitted on the guide pin 1028a, so that the rotor 1028 is inserted while being guided by the guide pin 1028a.

Namely, when the disc portion 1057 of the rotor 1028 is fitted on the positioning shaft portion 1049 of the motor shaft 1031, a rotational center Gr of the rotor 1028 can be made to coincide with an axial center Gp of the pinion 1037 (the rotor 1028 and the pinion 1037 are made concentric with each other). As this occurs, since the rolling bearing 1032 is fastened to the motor case 1026 with the bolts 1196 . . . , the rotor 1028 is assembled by erecting the guide pin 1028a in the internally threaded portion 1046a in the shaft flange portion 1043 and by fitting the bolt hole 1067, which also acts as the guide pin on the guide pin 1028a. Thus, the attachment and detachment of the magnetized rotor 1028 can be facilitated.

Following the above, the pin 1064 is fitted in the positioning hole 1063 in the rotor 1028 and the positioning hole 1048 in the shaft flange portion 1043. As a result, not only can the rotational center Gr of the rotor 1028 be made to coincide with the axial center Gp of the pinion 1037 (the rotor 1028 and the pinion 1037 are made concentric with each other) but also the rotor 1028 can be fixed in a more ensured fashion.

In addition, a bolt 1068 is screwed into the internally threaded portion 1046a into which the guide pin 1028a is not screwed so as to fix the rotor 1028, thereafter, the guide pin 1028a is removed, and a bolt 1068 is screwed into the internally threaded portion 1046a from which the guide pin 1028a has been removed so as to fix the rotor 1028.

When removing the rotor 1028, the assembling procedure is followed reversely.

Figure 12:
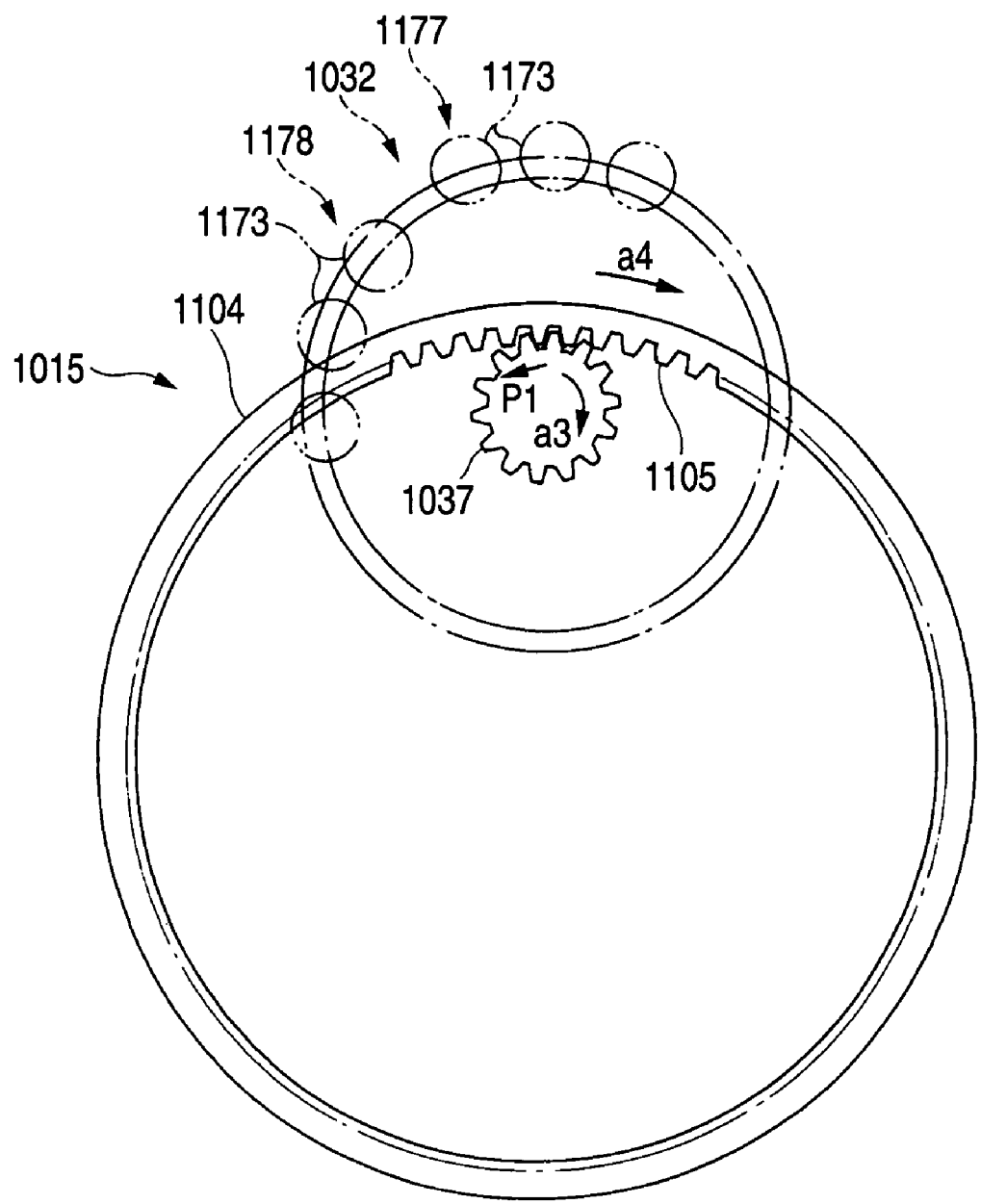
FIG. 12 is an explanatory diagram which explains a reaction force applied to the rolling bearing provided on the electric motor of the second embodiment of the invention.

FIG. 12 is an explanatory diagram which explains a reaction force which is applied to the rolling bearing provided on the electric motor of the invention.

In the reduction gear 1015, the internal gear 1104 is made to mesh with the pinion 1037 and the pinion 1037 is rotated in a direction indicated by an arrow a3. Then, the internal gear 1104 rotates in a direction indicated by an arrow a4. As this occurs, a reaction force P1 is produced in the pinion 1037, and the reaction force P1 so produced is then applied to the rolling bearing 1032 (refer to FIG. 13).

Figure 13:
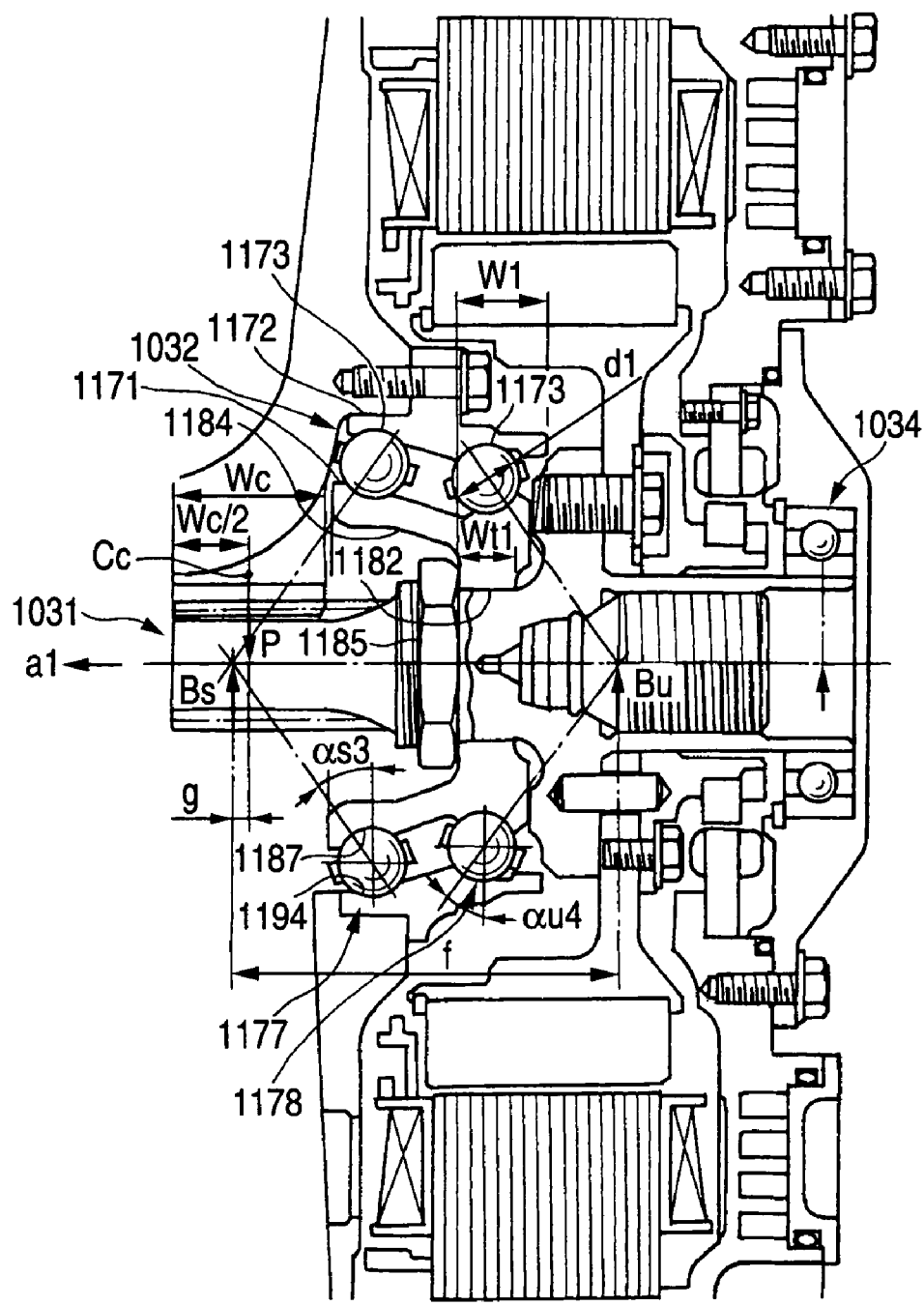
FIG. 13 is an explanatory diagram which explains a relationship between a width of the rolling bearing provided on the electric motor of the second embodiment of the invention and force applied to points of application of load and an output shaft portion.

FIG. 13 is an explanatory diagram which explains a relationship between the width of the rolling bearing provided on the electric motor of the invention and force which is applied to the load applied points and the output shaft portion. FIG. 9 is also referred to for the following description.

In the electric motor 1014, the fastening table portion 1182 of the inner bearing ring 1171 with a fastening portion provided on the rolling bearing 1032 is fitted on the central bearing portion 1042 of the motor shaft 1031. An end of the outer bearing ring 1172 with a fastening portion is brought into abutment with a stopper portion 1045 of the shaft flange portion 1043 provided on the motor shaft 1031. The nut 1185 is tightened, whereby the rolling bearing 1032 can be mounted on the motor shaft 1031. Namely, even with the double rows of the primary and secondary ball rows 1177, 1178, the width W1 of the rolling bearing 1032 is slightly larger than the spherical diameter d1 of the rolling element 1173, whereby the width of the double-row bearing can be decreased to a width which is equal to the width of the single-row bearing. Consequently, the width W1 of the rolling bearing 1032 can be decreased.

In the electric motor 1014, the rolling bearing 1032 is configured so as to have the contact angle $αs3$, the contact angle $αu4$, the points of application of load Bs, Bu and the distance f defined between the points of application of load Bs, Bu by the inner bearing ring 1171 with a fastening portion and the outer bearing ring 1172 with a fastening portion. Further, the point of application of load Bs is set in the position which stays away towards the outside (in the direction indicated by the arrow a2) from the face width center Cc of the contact face width Wc by the distance g. Therefore, the reaction force P1 of the driving force is applied the distance f between the application points Bs, Bu. Thus, even though the width W1 of the rolling bearing 1032 is decreased, the life of the rolling bearing 1032 of the electric motor 1014 can be secured.

In this way, the electric motor 1014 includes the externally threaded portion 1041 which is formed in the center of the motor shaft 1031, the central bearing portion 1042 which is formed over the length LP which corresponds to the bearing width of the single-row bearing in such a manner as to continuously follow the externally threaded portion 1041 and the shaft flange portion 1043 which is formed in such a manner as to continuously follow the central bearing portion 1042. The rolling bearing 1032 includes the outer bearing ring 1172 with a fastening portion which is brought into abutment with the shaft flange portion 1043 and the cup-shaped inner bearing ring 1171 with a fastening portion which is disposed inwards of the outer bearing ring 1172 with a fastening portion and which includes the fastening table portion 1182 which is pressed against by the nut 1185 which is screwed on the externally threaded portion 1041. In this configuration, by fitting the fastening table portion 1182 of the inner bearing ring 1171 with a fastening portion on to the central bearing portion 1042 of the motor shaft 1031, the rolling bearing 1032 can be held by the fastening table portion 1182 which receives the surface pressure of the nut 1185 and the end of the outer bearing ring 1172 with a fastening portion which is brought into abutment with the shaft flange portion 1043, whereby the double-row rolling bearing 1032 can be mounted with the width which is substantially the same as the width of the single-row bearing. Namely, even with the double-row rolling bearing 1032, the width of the rolling bearing 1032 can be decreased.

As is shown in FIGS. 8 and 9, of the double rows, the primary ball row 1177 is arranged along the pitch circle having the primary pitch circle diameter D3 on a distal end side of the motor shaft 1031, and the second ball row 1178 is arranged along the pitch circle having the secondary pitch circle diameter D4 on the center side of the motor shaft 1031 with the primary pitch circle diameter D3 made larger than the secondary pitch circle diameter D4. In this configuration, when setting the point of application of load Bs of the primary ball row 1177 which has the pitch circle diameter D3 which is larger, the setting of the distance f between the application points Bs, Bu is facilitated. Namely, even though the width of the double-row rolling bearing is decreased to a width which is equal to the width of the single-row rolling bearing, the degree of freedom in designing the application point Bs of the primary ball row 1177 included in the double-row rolling bearing 1032 can be enhanced.

As is shown in FIG. 8, in the gear accommodation chamber 1072, the oil flow path 1097 is opened in the partition wall 1073 for allowing a lubricating oil Z to be led into the motor accommodation chamber 1071. Therefore, the lubricating oil Z can be supplied to the rolling bearings 1021, 1032 by virtue of the rotation of the internal gear 1104. Consequently, there is no need to provide on the rolling bearing 1032 a grease reservoir for reserving grease therein, a sealing member for grease and the like.

In addition, the lubricating hole 1066 is opened in the rotor 1028. Therefore, the lubricating hole 1066 can enable the lubrication of the rolling bearing 1032 through the lubricating hole 1066 by virtue of the rotation of the internal gear 1104 and rotation of the rotor 1028.

As is shown in FIG. 13, the rolling bearing 1034 supports the rear end 1033 of the motor shaft 1031. Therefore, load applied to the motor shaft 1031 can be received by the rolling bearing 1034, thereby making it possible to increase further the strength with which the motor shaft 1031 is supported.

The electric motor of the invention is preferably applied to an in-wheel motor of a vehicle.

The electric motor of the second embodiment of the invention may be mounted on the vehicle wheel driving apparatus of the first embodiment of the invention, as shown in FIGS. 1 and 7. According to the combination of the first and second embodiments of the invention, the vehicle wheel driving apparatus can be made smaller than the case where the only first embodiment is employed.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicle wheel driving apparatus comprising:
   an in-wheel motor;
   a hub of a wheel which comprises a driven portion;
   a power transmission mechanism which transmits power of the in-wheel motor to the driven portion of the hub of the wheel; and
   a double-row rolling bearing which supports the hub and comprises:
      an inner ring disposed on a hub side;
      an outer ring disposed on a stationary side; and
      a plurality of rolling elements which is provided between the inner and outer rings and comprises:
         a primary row; and
         a secondary row of which pitch circle diameter is larger than that of the primary row, and which is positioned closer to the driven portion relative to the primary row,
   wherein the in-wheel motor and the power transmission mechanism are mounted in a rim of the wheel,
   the primary row is offset in an opposite direction from the secondary row along a wheel width direction, and
   the primary row and the secondary row intersect a common plane that is orthogonal to a rotational axis center of the wheel, wherein the in-wheel motor comprises:
   a motor shaft supported by a primary double row bearing and a secondary bearing; and an output shaft portion which is extended in a axial direction of the motor shaft from a portion of the motor shaft supported by the primary double row bearing, and transmits the power of the in-wheel motor to the driven portion of the hub, wherein the secondary bearing supports an end of the motor shaft which is opposite side of the output portion, wherein the primary double row bearing comprises:
   inner and outer rings; and
   a plurality of rolling elements provided between the inner and outer rings and comprising:
      a tertiary row which is positioned close to the driving portion; and
      a fourth row which is positioned close to the secondary bearing, wherein a point of application of load of tertiary row is offset towards the output shaft portion side, a pitch circle diameter of the tertiary row is larger than that of fourth row, and the pitch circle diameter of the tertiary row is set such that the point of application of load of the tertiary row coincides with or gets close to a load point of the output shaft portion.

2. The vehicle wheel driving apparatus as set forth in claim 1, wherein a point of application of load of the primary row of rolling elements is set outwards, and a point of application of load of the secondary row is set inwards.

* * * * *